United States Patent
Pinto, IV et al.

(10) Patent No.: US 8,203,818 B2
(45) Date of Patent: Jun. 19, 2012

(54) TEMPERATURE PROTECTION SYSTEM FOR ELECTRONIC DEVICES

(75) Inventors: Nicholas W. Pinto, IV, Ferndale, MI (US); Nancy L. Johnson, Northville, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

(21) Appl. No.: 12/704,854

(22) Filed: Feb. 12, 2010

(65) Prior Publication Data
US 2011/0199711 A1    Aug. 18, 2011

(51) Int. Cl.
*H02H 5/00* (2006.01)
(52) U.S. Cl. .............................................. 361/103
(58) Field of Classification Search .................. 361/103
See application file for complete search history.

(56) References Cited

U.S. PATENT DOCUMENTS

| | | | | |
|---|---|---|---|---|
| 5,898,557 A | * | 4/1999 | Baba et al. | 361/103 |
| 6,639,502 B2 | * | 10/2003 | Herrick | 337/102 |
| 6,850,400 B2 | * | 2/2005 | Bremond et al. | 361/103 |
| 7,713,471 B2 | * | 5/2010 | Valencia Avila et al. | 422/26 |
| 2002/0018330 A1 | * | 2/2002 | Bremond et al. | 361/103 |
| 2004/0042142 A1 | * | 3/2004 | Ikeda | 361/103 |
| 2010/0119881 A1 | * | 5/2010 | Patel et al. | 429/7 |

OTHER PUBLICATIONS

Hiroshi, Overheat Protector, Aug. 11, 1995; Abstract.*

* cited by examiner

*Primary Examiner* — Dharti Patel
(74) *Attorney, Agent, or Firm* — Quinn Law Group, PLLC

(57) ABSTRACT

An electronics system includes an electronic device, a power source and a temperature control switch. An actuator having a shape memory alloy is attached to the temperature control switch and moves the temperature control switch between an open position preventing a current flow between the power source and the electronic device, and a closed position permitting current flow between the power source and the electronic device. The shape memory alloy transforms shapes upon the ambient temperature falling below a low critical temperature or rising above a high critical temperature to move the temperature control switch into one of the closed position to permit current flow to the electronic device or the open position to prevent current flow to the electronics device respectively.

15 Claims, 1 Drawing Sheet

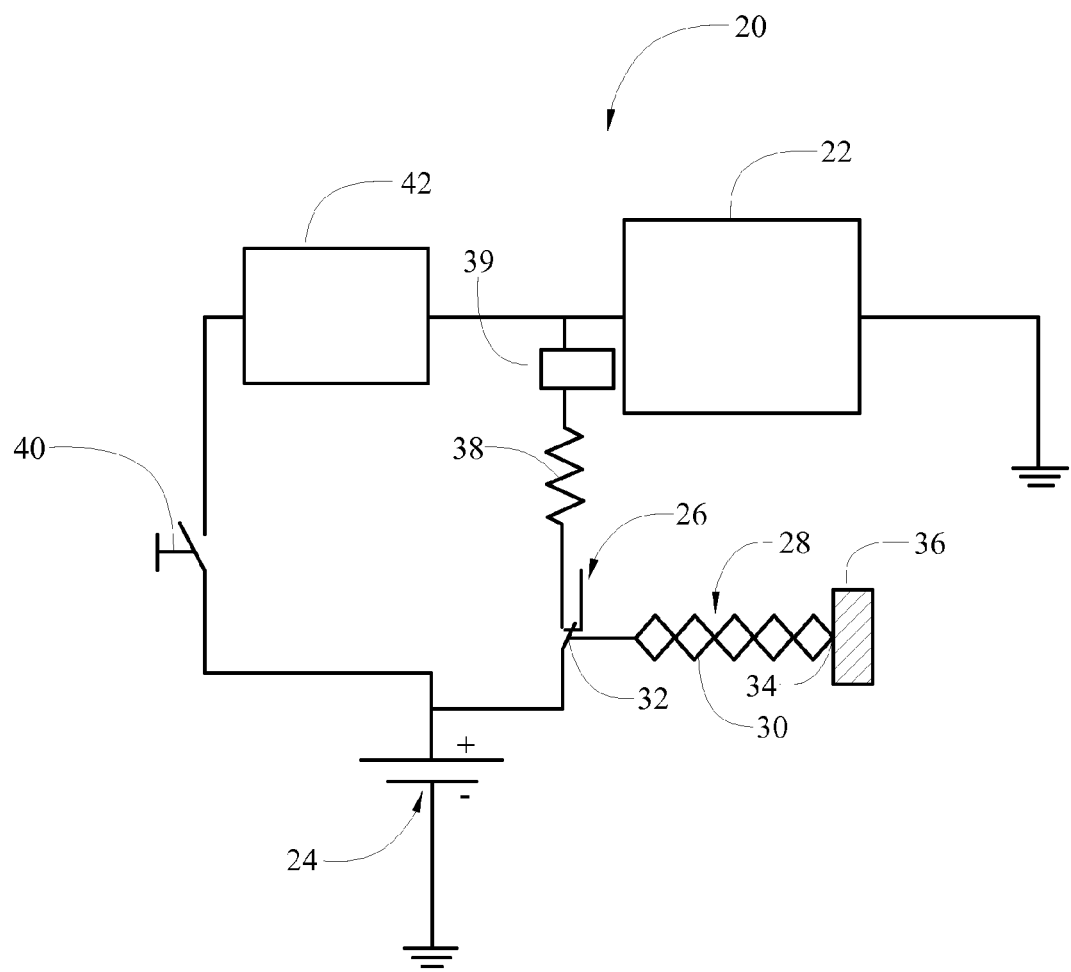

TEMPERATURE PROTECTION SYSTEM FOR ELECTRONIC DEVICES

TECHNICAL FIELD

The invention generally relates to electronic devices, and more specifically to a system for protecting electronic devices from damage caused by extreme temperatures.

BACKGROUND OF THE INVENTION

Many electronic devices are susceptible to damage caused by extreme temperatures, i.e., extreme cold and/or extreme heat. The extreme temperatures may cause various components of the electronic devices to fail. Most electronic devices must be stored within a pre-defined temperature storage range, and should only be operated within a pre-defined temperature operation range. For example, an LCD display screen should be stored within a temperature range of between −20° C. and 80° C., and should only be operated within a temperature range of between 0° C. and 50° C. Storage and/or operation of the electronic devices outside of these temperature ranges may result in damage to the electronic devices.

SUMMARY OF THE INVENTION

An electronics system is disclosed. The electronics system includes an electronic device. A power source is selectively coupled to the electronic device. The power source supplies an electrical current to the electronic device. A temperature control switch interconnects the power source and the electronic device. The temperature control switch is moveable between an open position and a closed position. In the open position, current flow is prevented between the power source and the electronic device. In the closed position, current flow is permitted between the power source and the electronic device. An actuator is coupled to the temperature control switch, and is moveable in response to a change in temperature. The actuator moves the temperature control switch between the open position and the closed position. The actuator is configured for moving the temperature control switch into at least one of the closed position, upon the temperature adjacent the electronic device falling below a low critical temperature, and the open position, upon the temperature adjacent the electronic device rising above a high critical temperature.

In another aspect of the invention, an electronics system is disclosed. The electronics system includes an electronic device. A power source is selectively coupled to the electronic device. The power source supplies an electrical current to the electronic device. A temperature control switch interconnects the power source and the electronic device. The temperature control switch is moveable between an open position and a closed position. In the open position, current flow is prevented between the power source and the electronic device. In the closed position, current flow is permitted between the power source and the electronic device. An actuator is coupled to the temperature control switch, and is moveable in response to a change in temperature. The actuator moves the temperature control switch between the open position and the closed position. The actuator is configured for moving the temperature control switch when the temperature adjacent the electronic device falls below a low critical temperature of the electronic device, or rising above a high critical temperature of the electronic device. The actuator includes a shape memory alloy that transforms at one of the low critical temperature and the high critical temperature to change shape and move the temperature control switch between the open position and the closed position.

Accordingly, the shape memory alloy of the actuator both senses the ambient temperature adjacent the electronic device and transforms, i.e., changes shape, to actuate the temperature control switch upon reaching one of the low critical temperature and the high critical temperature. The low critical temperature is the temperature below which the electronic device is susceptible to damage from freezing. The high critical temperature is the temperature above which the electronic device is susceptible to damage from overheating. When the ambient temperature adjacent the electronic device falls below the low critical temperature, the actuator may close the temperature control switch to permit current flow between the power source and the electronic device, thereby heating the electronic device with the current flow and minimizing damage to the electronic device from extreme cold temperatures. When the ambient temperature adjacent the electronic device rises above the high critical temperature, the actuator may open the temperature control switch to prevent current flow between the power source and the electronic device, thereby allowing the electronic device to cool, which minimizes damage to the electronic device from extreme high temperatures.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic diagram of an electronics system in accordance with the present invention.

DESCRIPTION OF THE PREFERRED EMBODIMENTS

Referring to FIG. 1, wherein like numerals indicate corresponding parts, an electronics system is shown generally at 20. The electronics system 20 includes an electronic device 22 that is sensitive to and/or susceptible to damage from extreme cold temperatures and/or extreme high temperatures. More specifically, at least a temperature sensitive portion of the electronic device 22 is sensitive to and/or susceptible to damage from extreme cold temperatures and/or extreme high temperatures. The electronic device 22 may include, but is not limited to, one of an LCD display, a battery, a cellular phone, a portable music device, a camera or some other electronic device 22 that includes a temperature sensitive portion that may be damaged by extreme cold temperatures.

The electronics system 20 further includes a power source 24. The power source 24 is selectively coupled to the electronic device 22 for supplying an electrical current to the electronic device 22. The power source 24 may include a battery, a generator, a power grid, or any other suitable source of electrical power. Both the electronic device 22 and the power source 24 are each grounded.

The electronics system 20 further includes a temperature control switch 26. The temperature control switch 26 interconnects the power source 24 and the electronic device 22. The temperature control switch 26 is moveable between an open position and a closed position. When in the open position, the temperature control switch 26 prevents current flow between the power source 24 and the electronic device 22. When in the closed position, the temperature control switch 26 permits current flow between the power source 24 and the electronic device 22. The temperature control switch 26 may include any suitable type, size and/or configuration of electrical switch particularly suited for the specific electronic device 22.

The electronics system 20 further includes an actuator 28. The actuator 28 is coupled to the temperature control switch 26, and is moveable in response to a change in temperature. It should be appreciated that the temperature control switch 26 and the actuator 28 may be separate components, or alternatively, may be integrally formed as a single component. The actuator 28 moves the temperature control switch 26 between the open position and the closed position. More specifically, when configured to protect the electronic device from extreme cold temperatures, the actuator 28 moves the temperature control switch 26 into the closed position upon the temperature adjacent the electronic device 22 falling below the low critical temperature, and moves the temperature control switch 26 into the open position upon the temperature adjacent the electronic device 22 rising above the low critical temperature. When the actuator 28 is configured to protect the electronic device 22 from extreme high temperatures, the actuator 28 moves the temperature control switch 26 into the open position when the temperature adjacent the electronic device 22 rises above the high critical temperature, and moves the temperature control switch 26 into the closed position when the temperature adjacent the electronic device 22 falls below the high critical temperature.

The low critical temperature and the high critical temperature are the temperatures at which the actuator 28 may move the temperature control switch 26. The low critical temperature is set to a temperature that is higher than the temperature below which the electronic device 22, or at least the portion of the electronic device 22 that is susceptible to damage from extreme cold temperatures, may be damaged by the cold temperatures. The low critical temperature is dependent upon and varies with the specific electronic device 22. However, it should be appreciated that the low critical temperature may be defined as a temperature equal to or below 5° C. However, the low critical temperature may vary above or below the 5° C. level described above and is dependent upon the specific electronic device 22. Accordingly, it should be appreciated that the low critical temperature is higher than the temperature at which the electronic device 22 may be damaged from extreme cold so as to ensure that the actuator 28 engages the temperature control switch 26 prior to the temperature of the electronic device 22 falling to a level that may damage the electronic device 22. As such, the low critical temperature may be set to a value approximately 2-5° C. above the temperature at which the electronic device 22 may be damaged by extreme cold.

The high critical temperature is set to a temperature that is lower than the temperature above which the electronic device 22, or at least the portion of the electronic device 22 that is susceptible to damage from extreme high temperatures, may be damaged by the high temperatures. The high critical temperature is dependent upon and varies with the specific electronic device 22. However, it should be appreciated that the high critical temperature may be defined as a temperature equal to or above 45° C. However, the high critical temperature may vary above or below the 45° C. level described above and is dependent upon the specific electronic device 22. Accordingly, it should be appreciated that the high critical temperature is lower than the temperature at which the electronic device 22 may be damaged from extreme heat so as to ensure that the actuator 28 engages the temperature control switch 26 prior to the temperature of the electronic device 22 rising to a level that may damage the electronic device 22. As such, the high critical temperature may be set to a value approximately 2-5° C. below the temperature at which the electronic device 22 may be damaged by extreme heat.

In order to ensure that the actuator 28 senses the ambient temperature immediately adjacent the temperature sensitive portion of the electronic device 22 that is susceptible to damage from the extreme cold or hot temperatures, the actuator 28 is disposed adjacent the temperature sensitive portion of the electronic device 22 for sensing a temperature adjacent the temperature sensitive portion. Preferably, the actuator 28 is positioned adjacent the temperature sensitive portion of the electronic device 22 in an area relative to the electronic device 22 that is most likely to be submitted to the coldest ambient temperatures and/or the hottest ambient temperatures. When configured to protect against extreme cold temperatures, the actuator 28 senses the temperature adjacent the temperature sensitive portion of the electronic device 22 and moves the switch into the closed position at the low critical temperature, before the temperature of the electronic device 22 falls below the low critical temperature and damages the electronic device 22. When in the closed position, an electrical current flows from the power source 24 to the electronic device 22 to heat the electronic device 22, thereby preventing damage to the electronic device 22 from extreme cold temperatures. It should be appreciated that the actuator 28 may alternatively move the temperature control switch 26 into the open position upon the temperature falling below the low critical temperature. In such a configuration, the electronic device 22 is prevented from operating at or below the low critical temperature, thereby preventing damage from operation of the electronic device 22 at or below the low critical temperature.

When configured to protect against extreme high temperatures, the actuator 28 senses the temperature adjacent the temperature sensitive portion of the electronic device 22 and moves the switch into the open position at the high critical temperature, before the temperature of the electronic device 22 rises above the high critical temperature and damages the electronic device 22. When in the open position, the temperature control switch 26 prevents an electrical current from flowing between the power source 24 and the electronic device 22, thereby allowing the electrical device 22 to cool and prevent damage to the electronic device 22 from overheating.

The actuator 28 includes a shape memory alloy 30. The properties of the shape memory alloy 30 are described in greater detail below. The shape memory alloy 30 transforms shape at either the low critical temperature or the high critical temperature to move the temperature control switch 26 between the open position and the closed position. Accordingly, the shape memory alloy 30 is dependent upon the low critical temperature and the high critical temperature. As described herein, the shape memory alloy 30 acts both as a sensor for sensing the ambient temperature adjacent the electronic device 22, and as an integral part of the actuator 28 for moving the temperature control switch 26.

As depicted in FIG. 1, the actuator 28 includes a first end 32 coupled to the temperature control switch 26 and a second end 34 attached to an anchor point 36. The anchor point 36 may include any securely fixed position, such as but not limited to, a casing of the electronic device 22. The shape memory alloy 30 expands or contracts against the anchor point 36 to move the first end 32 of the actuator 28. Accordingly, as the shape memory alloy 30 expands and contracts, the position of the anchor point 36 remains fixed, with the first end 32 of the shape memory alloy 30 moving relative to the anchor point 36. Movement of the first end 32 of the shape memory alloy 30 moves the switch between the open position and the closed position. The anchor point 36 is electrically isolated to ensure no current flows through the shape memory alloy 30, which would adversely affect the ability of the shape memory alloy 30 to properly sense the ambient temperature.

It should be appreciated that the actuator 28 and the shape memory alloy 30 of the actuator 28 may be configured into any suitable shape, sized, orientation or configuration, and may operate in a manner other than shown or described herein. Accordingly, it should be appreciated that the actuator 28 should be interpreted broadly to include any suitable device including a shape memory alloy 30 that is capable of moving the temperature control switch 26 between the open position and the closed position.

The electronics system 20 may further include a resistor 38. The resistor 38 is disposed between the temperature control switch 26 and the electronic device 22. The resistor 38 may include any suitable resistor 38 for restricting the current flow between the power source 24 and the electronic device 22. The resistor 38 is sized to only allow enough current flow to the electronic device 22 to heat the electronic device 22 and keep the electronic device 22 from freezing, but should not permit enough current through to allow operation of the electronic device 22, thereby conserving energy.

The electronics system 20 may further include a heating element 39. The heating element 39 is coupled to the power source 24 when the temperature control switch 26 is in the closed position. Accordingly, when the temperature control switch 26 is in the closed position, a current may flow to the heating element 39. The heating element 39 is configured and positioned to heat the electronic device 22. As such, the heating element 39 may be disposed within or adjacent the electronic device 22. The heating element 39 may include any device capable of generating heat upon receiving an electrical current from the power source 24.

The electronics system 20 may further include an on/off switch 40. The on/off switch 40 is coupled to and interconnects the power source 24 and the electronic device 22. The on/off switch 40 is configured for turning the electronic device 22 on and off. The on/off switch 40 may include any suitable switch suitable for activating the electronic device 22. The on/off switch 40 is moveable between an on position for powering the electronic device 22, and an off position disconnecting the electronic device 22 from the power source 24. When in the on position, the current flow from the power source 24 flows through the on/off switch 40, and bypasses the temperature control switch 26. Accordingly, it should be appreciated that the on/off switch 40 does not affect the operation of the actuator 28 and/or the temperature control switch 26.

The electronics system 20 may further include a controller 42. The controller 42 may include a computer, processor or the like, and is configured for controlling the operation of the electronic device 22. As shown, the controller 42 is powered through the on/off switch 40. However, it should be appreciated that the controller 42 may be powered from some other source.

Suitable shape memory alloys may exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloy, which generally exists at lower temperatures. The austenite phase, the stronger phase of shape memory alloy, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloy, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloy can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

The shape memory alloy 30 is activated by exposure to the ambient temperature surrounding the electronic device 22. Accordingly, when the actuator 28 is configured to protect against cold temperatures, a decrease in temperature from above the low critical temperature to below the low critical temperature activates the shape memory alloy 30 to transform shape. Similarly, an increase in temperature from below the low critical temperature to above the low critical temperature may also activate the shape memory alloy 30 to transform shape. When the actuator 28 is configured to protect against high temperatures, an increase in temperature from below the high critical temperature to above the high critical temperature activates the shape memory alloy 30 to transform shape. Similarly, a decrease in temperature from above the high critical temperature to below the high critical temperature may also activate the shape memory alloy 30 to transform shape. Additionally, the actuator 28 may include a biasing device to move the actuator 28 back to an initial position in response to the ambient temperature adjacent the electronic device 22 rising from below the low critical temperature to above the low critical temperature, or in response to the ambient temperature adjacent the electronic device 22 falling from above the high critical temperature to below the high critical temperature.

While the best modes for carrying out the invention have been described in detail, those familiar with the art to which this invention relates will recognize various alternative designs and embodiments for practicing the invention within the scope of the appended claims.

The invention claimed is:

1. An electronics system comprising:
    an electronic device;
    a power source selectively coupled to said electronic device for supplying an electrical current to said electronic device;
    a temperature control switch interconnecting said power source and said electronic device and moveable between an open position preventing current flow between said power source and said electronic device and a closed position permitting current flow between said power source and said electronic device; and
    an actuator coupled to said temperature control switch and moveable in response to a change in temperature to move said temperature control switch between said open position and said closed position, wherein said actuator is configured for moving said temperature control switch into at least one of said closed position when the temperature adjacent said electronic device falls below a low critical temperature of said electronic device, and said open position when the temperature adjacent said electronic device rises above a high critical temperature of said electronic device;
    wherein said actuator includes a shape memory alloy having a first end coupled to said temperature control switch and a second end attached to an anchor point; and
    wherein said shape memory alloy expands and contracts against said anchor point to move said first end of said actuator.

2. An electronics system as set forth in claim 1 wherein said shape memory alloy transforms at one of said low critical temperature and said high critical temperature to change shape and move said temperature control switch between said open position and said closed position.

3. An electronics system as set forth in claim 1 wherein said actuator is disposed adjacent a temperature sensitive portion of said electronic device that is susceptible to damage from temperatures below said low critical temperature and above said high critical temperature.

4. An electronics system as set forth in claim 1 wherein said anchor point is electrically isolated.

5. An electronics system as set forth in claim 1 further comprising a resistor disposed between said temperature control switch and said electronic device.

6. An electronics system as set forth in claim 1 wherein said electronic device includes one of an LCD display and a battery.

7. An electronics system as set forth in claim 1 further comprising a heating element coupled to said power source when said temperature control switch is in said open position and configured for heating said electronic device.

8. An electronics system as set forth in claim 1 wherein said electronic device and said power source are each grounded.

9. An electronics system comprising:
    an electronic device;
    a power source selectively coupled to said electronic device for supplying an electrical current to said electronic device;
    a temperature control switch interconnecting said power source and said electronic device and moveable between an open position preventing current flow between said power source and said electronic device and a closed position permitting current flow between said power source and said electronic device; and
    an actuator coupled to said temperature control switch and moveable in response to a change in temperature adjacent said electronic device to move said temperature control switch between said open position and said closed position, wherein said actuator is configured for moving said temperature control switch when the temperature adjacent said electronic device falls below a low critical temperature of said electronic device or rises above a high critical temperature of said electronic device;
    wherein said actuator includes a shape memory alloy that transforms at one of said low critical temperature and said high critical temperature to change shape and move said temperature control switch between said open position and said closed position;
    wherein said actuator includes a first end coupled to said temperature control switch and a second end attached to an anchor point; and
    wherein said shape memory alloy expands and contracts against said anchor point to move said first end of said actuator.

10. An electronics system as set forth in claim 9 wherein said actuator is disposed adjacent a temperature sensitive portion of said electronic device that is susceptible to damage from temperatures below said low critical temperature and above said high critical temperature.

11. An electronics system as set forth in claim 9 wherein said anchor point is electrically isolated.

12. An electronics system as set forth in claim 9 further comprising a resistor disposed between said temperature control switch and said electronic device.

13. An electronics system as set forth in claim 9 further comprising a heating element coupled to said power source when said temperature control switch is in said open position and configured for heating said electronic device.

14. An electronics system as set forth in claim 9 wherein said actuator moves said switch into said closed position in response to the temperature adjacent said electronic device falling below said low critical temperature to permit a current flow to said electronic device.

15. An electronics system as set forth in claim 9 wherein said actuator moves said switch into said open position in response to the temperature adjacent said electronic device rising above said high critical temperature to prevent a current flow to said electronic device.

* * * * *